United States Patent [19]

Shimazu et al.

[11] Patent Number: 4,813,019
[45] Date of Patent: Mar. 14, 1989

[54] SEMICONDUCTOR INTEGRATED CIRCUIT

[75] Inventors: Yukihiko Shimazu; Narumi Sakashita, both of Itami, Japan

[73] Assignee: Mitsubishi Denki Kabushiki Kaisha, Tokyo, Japan

[21] Appl. No.: 111,048

[22] Filed: Oct. 21, 1987

[30] Foreign Application Priority Data

Oct. 29, 1986 [JP] Japan ................................ 61-259022

[51] Int. Cl.⁴ ............................................ G11C 13/00
[52] U.S. Cl. .................................... 365/189; 364/200; 365/230
[58] Field of Search ................. 365/189, 230; 364/200

[56] References Cited

U.S. PATENT DOCUMENTS 4,532,606 7/1985 Phelps .................................. 365/189

Primary Examiner—Terrell W. Fears
Attorney, Agent, or Firm—Nixon & Vanderhye

[57] ABSTRACT

A semiconductor integrated circuit includes an auxiliary instruction register group having a plurality of auxiliary instruction registers capable of setting in advance the content by a program, and one of the auxiliary instruction register selected by the output of the decoder or controls a portion of the semiconductor integrated circuit that is not controlled by the instruction of the instruction register or controls a portion while cooperating with the instruction register. Thus, the integrated circuit can effectively perform a control of large degree of freedoms in a short instruction register.

3 Claims, 2 Drawing Sheets

SEMICONDUCTOR INTEGRATED CIRCUIT

BACKGROUND OF THE INVENTION

The present invention relates to a semiconductor integrated circuit having an instruction register.

Since a RAM and a ROM for a number of data are required in general in digital signal processing and an pointer control is frequently necessary at every data calculation, an instruction format is composed to simultaneously calculate for accelerating a process and to control the pointer in a digital signal processor. The pointer means an addressing register for a RAM or a ROM.

FIG. 3 is a block diagram showing a conventional digital signal processor. Referring to FIG. 3, the conventional digital signal processor includes a 512-words 23 bits instruction ROM 1, a 23-bit length instruction register 2, a pointer control circuit 5, a 7-bit length data pointer (hereinafter referred to as "DP") 6, a data RAM 7, a 9-bit length ROM pointer (hereinafter referred to as "RP") 9, and a data ROM 10.

This processor inputs an instruction read from the instruction ROM 1 in the instruction register 2, and uses specific fields of the instruction register 2 to control the two pointers, i.e., the DP 6 and the RP 9.

FIG. 4 is a view showing an operation instruction format 20b of one of four instruction formats of the processor in FIG. 3.

The operation instruction format 20b can control the two pointers, and has eight fields. When a field 21 having 22nd bit and 21st bit is "00", it indicates an operation instruction. A P-SEL field 22 having 20th and 19th bits selects a P input of an arithmetic and logic unit (hereinafter referred to as "an ALU"), an ALU field 23 having 18th to 15th bits assigns the function of the ALU, an ASL field 24 having 14th bit assigns to select an accumulator A or B for the input/output of the ALU, and these three fields mainly assigns the control of ALU execution. A $DP_L$ field 25 having 13th and 12th bits alters the values of less significant 4 bits of the DP 6, a $DP_H.M$ field 25 having 11th to 9th bits modifies or alters the more significant 3 bits of the data pointer, an RPDCR field 27 having 8th bit assigns to decrement (−1) the content of the RP or not, and these three fields mainly assign the control of the pointers. An SRC field 28 having 7th to 4th bits assigns a register which outputs the content to an internal data bus, a DST field 29 having 3rd to 0th bits assigns a register which inputs the content of the internal data bus, and these two fields mainly assign the control of the internal but transfer.

In the processor in FIG. 3, the two pointers are controlled by 6 bits of 3th to 8th bits simultaneously upon assigning of calculation of the ALU.

field for controlling the pointers are operated as below.

The DP 6 is controlled by 5 bits of the $DP_L$ field 5 and the $DP_H.M$ field 26. The $DP_L$ field 25 can assign the 4 kinds of function to control the less significant 4 bits of the DP 6 for NOP (no-operation), increment (+1), decrement (−1) and zero clear. An exclusive OR (XOR) is calculated with the values of the 3 bits of the $DP_H.M$ field 26 and the values of the more significant 3 bits of the DP 6, and the result is returned to the more significant 3 bits of the DP 6. If the more significant 3 bits are not desired to be altered, the $DP_H.M$ field 26 may be set to "000". If only the most significant bit is desired to be inverted, the field 26 may be set to "100". This is mainly used for assigning the page of the data RAM 7. The RP 9 is controlled only by 1 bit of the RPDCR field 27. The content is mere decrement as described above to have low degree of freedoms as compared with the DP 6. For example, to alter the assignment of the page of the data ROM 10, the following three step processes are necessarily executed.

(1) A bit pattern to be used for the XOR calculation is loaded (stored) in the accumulator A.
(2) The value of the RP 9 is calculated through the internal bus by the ALU for the XOR.
(3) The result stored in the accumulator A is again returned to the RP 9.

Thus, in the prior art, to obtain the same degree of freedoms of the control as the DP 6 for the RP 9, the RP 9 must be controlled in the 5 bit length instruction field, and the instruction register 2 is lengthened for another 4 bit length.

When the number of the pointers is increased or the degree of freedoms of addressing is raised in the above-mentioned conventional semiconductor integrated circuit, the number of fields is increased, and the bit length of the instruction register is increased. Thus, there arise drawbacks that the memory capacity of the program is increased, and wasteful fields exist when the pointer and the calculation are not simultaneously assigned. Therefore, to suppress the price of the integrated circuit, the control of the pointers is limited in tee conventional processor. Thus, the conventional processor has such drawbacks that the number of steps of the program is increased and the executing speed is decelerated.

SUMMARY OF THE INVENTION

An object of the present invention is to provide a semiconductor integrated circuit which can eliminate the above-mentioned drawbacks and which can effectively perform a control of large degree of freedoms in a short instruction register.

In order to achieve this and other objects, there is provided according to the present invention a semiconductor integrated circuit comprising an auxiliary instruction register group having a plurality of auxiliary instruction registers capable of setting in advance the content by a program, and one of the auxiliary instruction registers selected by the output of the decoder controls portion of the semiconductor integration circuit that is not controlled by the instruction of the instruction register or controls a portion while cooperating with the instruction register.

In the present invention, when the auxiliary instruction register is selected by the output of the decoder, the control of the portion that is not assigned for an operation of the instruction of the instruction register is done by the content of the auxiliary instruction register which is setted by a program in advance or the control of the portion that is assigned for an operation of the instruction of the instruction register is modified.

DETAILED DESCRIPTION OF THE PREFERRED EMBODIMENTS

An embodiment of a semiconductor integrated circuit according to the present invention will be described with reference to FIGS. 1 and 2.

Figure 1:
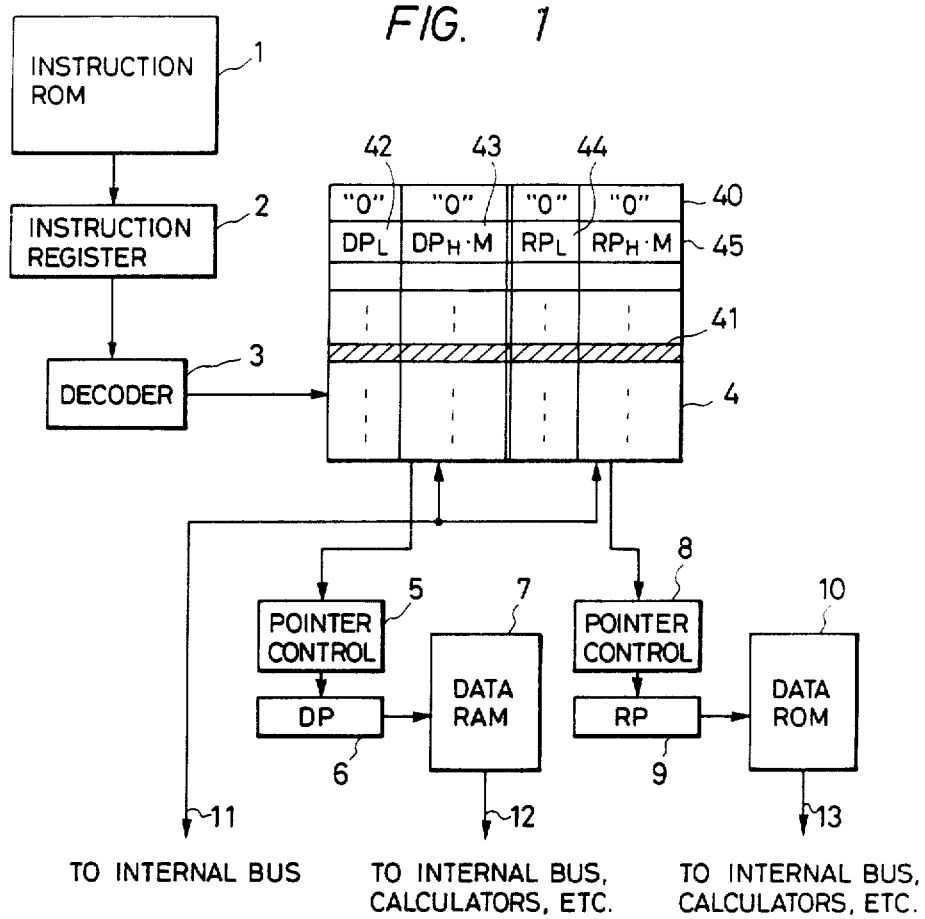
FIG. 1 is a block diagram showing a semiconductor integrated circuit of an embodiment of the present invention.
Figure 3:
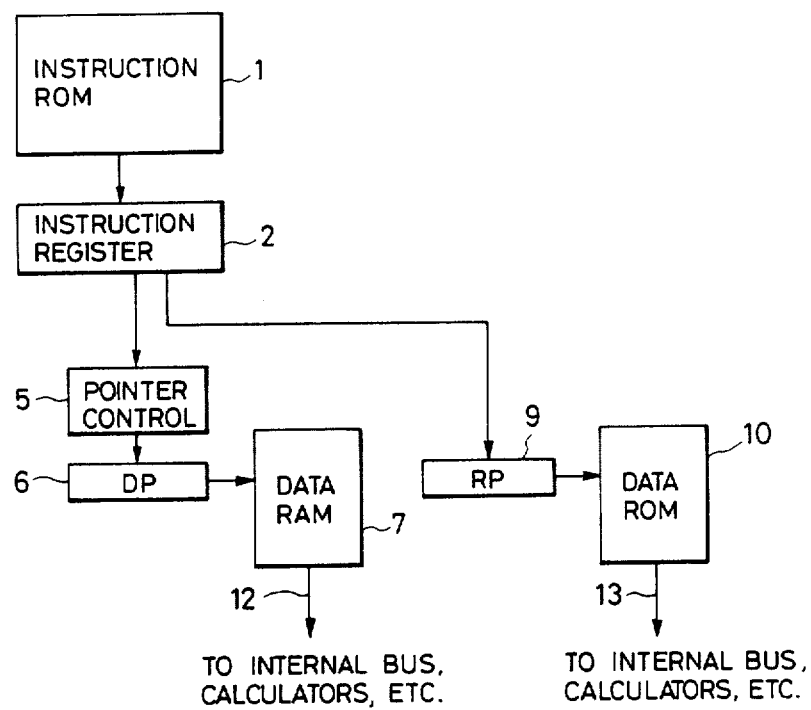
FIG. 3 is a block diagram showing a conventional processor.
Figure 4:
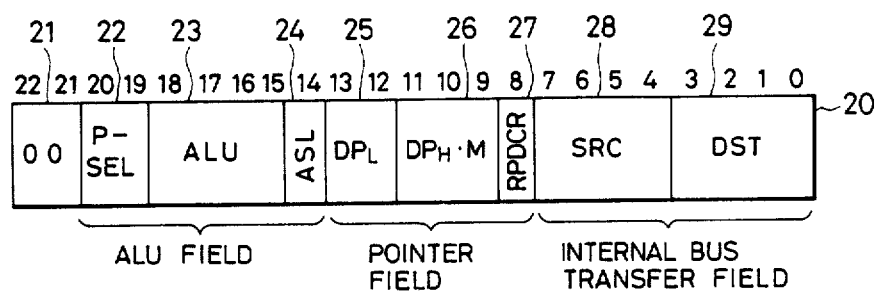
FIG. 4 is a view showing a conventional operation instruction format.

In FIG. 1, the same reference numerals as those in FIG. 3 depict the same or equivalent components, and therefore descriptions of these components are omitted for avoidance of duplication. Reference numeral 3 depicts a decoder. Reference numeral 4 depicts a 10-bit length 64-set auxiliary instruction register group, reference numeral 8 depicts a pointer control circuit, and reference numeral 11 depict signal lines.

In the semiconductor integrated circuit of the present invention, an instruction read from the instruction ROM 1 is led to an instruction register 2, and one auxiliary instruction register 41 indicated by the specific field of the instruction register 2 is used to control two pointers, i.e., DP 6 and RP 9 as portions not assigned for an operation by the instruction of the instruction register.

Figure 2:
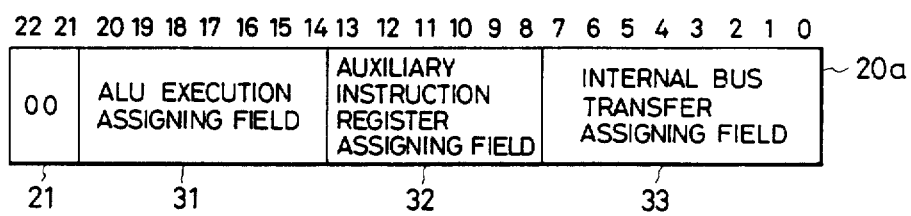
FIG. 2 is a view showing an example of an operation instruction format of the invention.

FIG. 2 is a view showing an example of an operation instruction format 20a for controlling a calculation and the pointer in the semiconductor integrated circuit of the present invention. When a field 21 having 22nd bit and 21st bit is "00", it indicates an operation instruction. In FIG. 2, an ALU execution assigning field 31 having 20th to 14th bits assigns the control of an arithmetic and logic calculations. 7th to 0th bits form an internal bus transfer assignment field 33 for assigning the control of the transfer mainly for the internal bus and do not substantially relate to the present invention in the same manner as the conventional processor. 13th to 8th bits form an auxiliary instruction register assigning field 32 for assigning one auxiliary instruction register 41 of an auxiliary instruction register group 4.

The control field of the pointer of the auxiliary instruction register group 4 will be described in detail.

DP 6 is controlled by totally 5 bits of $DP_L$ field 42 having the same 2 bit length as the processor in FIG. 3 and $DP_H.M$ field 42 having the same 3 bit length. The $DP_L$ field 42 can assign the 4 controls of the less significant 4 bits of the DP 6 for NOP (no-operation), increment (+1), decrement (−1) and zero clear. An exclusive OR (XOR) is calculated with the values of the 3 bits of the $DP_H.M$ field 43 and the values of the more significant 3 bits of the DP 6, and the result is returned to the more significant 3 bits of the DP 6.

RP 9 is controlled by totally 5 bits of $RP_L$ field 44 having 2 bit length and the $RP_H.M$ field 45 having 3 bit length in the same manner as the DP 6. The content of the control is the same as the control field of the DP 6. Therefore, the RP 9 can not only decrement as in the processor in FIG. 3, but also increment, zero-clear and modify by XOR calculation simultaneously with the calculation instruction. "0" which indicates that the DP 6 and the RP 9 do not alter at all is fixedly written in 0th register 40 of the auxiliary instruction register group 4.

In the semiconductor integrated circuit of the present invention, when the pointer is controlled, it is necessary to set in advance a value if the auxiliary instruction register group 4 by signal lines 11 connected to the internal bus by other load instruction before the operation instruction is executed. However, when no alteration is required, the 0th register 40 in which "0" is written may be indicated. If the combinations of the control instructions for the DP 6 and the RP 9 are different, it is necessary to prepare the auxiliary instruction register groups 4 in the number of the combinations. However, the number of the combination of the pointed control instruction used at every data calculation necessary for high speed execution in digital signal processing is not so many, and the same combination may be preferably used. If it is not necessary to process with other combination at high speed, it may be loaded at every time immediately before the execution of the calculation. Thus, 64 sets of auxiliary instruction register group 4 is not always necessary as in this embodiment, 32 sets or 16 sets may be sufficient. In case of 32 sets of auxiliary instruction register group 4, the auxiliary instruction register assigning field 32 may be shortened from 6 bit length to 5 bit length, thereby possibly shortening 1 bit in the instruction register 2.

In the semiconductor integrated circuit of the invention, 64 words × 10 (=640) bit elements are increased for the auxiliary instruction register group 4, but more controls may be performed for the RP 9 in the same sizes of the instruction register 2 and the instruction ROM 1 as the conventional semiconductor integrated circuit. Further, in an embodiment having 32 sets of auxiliary register group 4, 32 words × 10 (=320) bit elements are increased for the auxiliary instruction register group 4, but the sizes of the instruction ROM 1 becomes from 512 words × 23 bits to 512 words × 22 bits to reduce by 512 × 1 (=512). If the same controls are executed in the conventional control, the sizes of the instruction ROM 1 becomes from 512 words × 23 bits to 512 words × 27 bits to increased by 514 × 4 (=2048) bits. Further, since the operation instructions occupy less than half of all the instruction spaces (512 words), most of the increased instruction ROM 1 becomes wasteful. If the integration of the semiconductor integrated circuit is improved, the space of the instructions will further increase from 512 words, and wasteful memories for controlling the RP 9 will furthermore increase that much.

In the embodiment described above, the case that the pointer is controlled as a portion that is not assigned for an operation by the instruction of the instruction register has been described as an example. However, the present invention is not limited to the particularly embodiment described above. For example, in other semiconductor integrated circuit having an instruction register such as a single chip microcomputer or a peripheral controller, the content of the portion except the pointer may be similarly performed, and the same advantages as those of the above-mentioned embodiment can be provided.

An area that cannot be rewritten by a program may be provided at least in the auxiliary instruction register group 4 within the spirit and the scope of the invention.

According to the present invention as described above, the semiconductor integrated circuit comprises the auxiliary instruction register group having a plurality of auxiliary instruction registers capable of setting in advance the content by a program, and one of the auxiliary instruction registers selected by the output of the decoder controls a portion of the semiconductor integrated circuit that is not controlled by the instruction of the instruction register or controls a portion while co-operating with the instruction register. Therefore, the semiconductor integrated circuit can be controlled larger degree of freedoms.

What is claimed is:

1. A semiconductor integrated circuit controlled by a program comprising:
   an instruction register for holding an instruction of the program fetched from internal or external memory and;
   a decoder for decoding said instruction in said instruction register and;
   an auxiliary instruction register group having a plurality of auxiliary instruction registers of which contents can be set in advance by said program;
   wherein one of said auxiliary instruction registers selected by the output of said decoder controls a portion of said semiconductor integrated circuit that is not controlled by the instruction of said instruction register or;
   one of said auxiliary instruction registers selected by the output of said decoder controls a portion of said semiconductor integrated circuit while cooperating with said instruction register.

2. The semiconductor integrated circuit of claim 1 wherein said auxiliary instruction registers have several fields and each said field controls a different portion of said semiconductor integrated circuit.

3. The semiconductor integrated circuit of claim 2 comprising at least one pointer of which value is controlled by one of said field.

* * * * *